United States Patent
Huang et al.

(10) Patent No.: US 7,620,826 B2
(45) Date of Patent: Nov. 17, 2009

(54) THERMAL THROTTLING DUTY ESTIMATION METHODS AND SYSTEMS FOR A CPU

(75) Inventors: Cheng-Wei Huang, Taipei (TW); Chia-Ming Hsu, Taipei (TW); Hao-Lin Lin, Taipei (TW); Wen-Juin Huang, Taipei (TW)

(73) Assignee: Via Technologies, Inc., Taipei (TW)

( * ) Notice: Subject to any disclaimer, the term of this patent is extended or adjusted under 35 U.S.C. 154(b) by 463 days.

(21) Appl. No.: 11/463,027

(22) Filed: Aug. 8, 2006

(65) Prior Publication Data
US 2007/0220288 A1  Sep. 20, 2007

(30) Foreign Application Priority Data
Mar. 20, 2006 (TW) .............................. 95109455 A

(51) Int. Cl.
*G06F 1/00* (2006.01)
*G06F 1/26* (2006.01)
*G01R 21/00* (2006.01)

(52) U.S. Cl. ..................... 713/300; 713/320; 702/60

(58) Field of Classification Search ................. 713/300, 713/320; 702/60
See application file for complete search history.

(56) References Cited

U.S. PATENT DOCUMENTS

| 7,017,058 | B2* | 3/2006 | Chen ......................... 713/322 |
| 7,036,030 | B1* | 4/2006 | Altmejd ..................... 713/322 |
| 7,058,824 | B2* | 6/2006 | Plante et al. ................ 713/300 |
| 7,353,409 | B2* | 4/2008 | Hartman et al. ............. 713/300 |
| 2006/0143486 | A1* | 6/2006 | Lamdan et al. ............. 713/320 |

FOREIGN PATENT DOCUMENTS

| CN | 1359043 | 7/2002 |
| CN | 1635448 | 7/2005 |

\* cited by examiner

*Primary Examiner*—Chun Cao
*Assistant Examiner*—Stefan Stoynov
(74) *Attorney, Agent, or Firm*—Thomas, Kayden, Horstemeyer & Risley

(57) ABSTRACT

Thermal throttling duty estimation methods for a CPU (Central Processing Unit) in a computer system are provided. The temperature of a CPU is highly related to the CPU performance. CPU temperature data (CPUT) is first acquired. A thermal throttle duty (TTD) is then calculated according to the acquired CPUT. Thereafter, the calculated TTD can be sent to the CPU and the CPU performance is accordingly adjusted.

12 Claims, 2 Drawing Sheets

THERMAL THROTTLING DUTY ESTIMATION METHODS AND SYSTEMS FOR A CPU

BACKGROUND OF THE INVENTION

1. Field of the Invention

The present invention relates to computer techniques, and more particularly to thermal throttling duty estimation methods and systems for a central processing unit (CPU).

2. Description of the Related Art

An overheated central processing unit (CPU) may damage or cause a computer system to crash. To prevent this potential risk, computer systems are provided with CPU temperature monitoring and regulation functions.

CPU temperature reflects, and typically, is strongly related to CPU performance, that is, CPU temperature is driven higher when CPU performance increases. Conventionally, a computer system sets up a thermal throttle duty (TTD) and asserts temperature adjustment function when the computer system is booted. The TTD may be configured through a basic input/output system (BIOS).

Next, the computer system waits for and determines a signal THERMAL_L from the CPU. The signals from the CPU may reflect the need for temperature adjustment which may be done by increasing or decreasing CPU performance. When the signal is TRUE, the CPU is overheated, a timer is then triggered, and temperature adjustment starts. The timer counts for temperature adjustment time. When the timer counts up to a predetermined value, the temperature adjustment terminates. Thus, regulation of CPU temperature is achieved by CPU performance adjustment restricted by the temperature adjustment time counted by the timer.

The current method, however, has disadvantages. For example, the thermal throttle duty (TTD) remains unchanged from the time the system boots and thus lacks flexibility to match CPU temperature variation. As is known, regulation of CPU temperature is achieved by CPU performance adjustment. The CPU performance may be over-downgraded affecting system performance due to an improper fixed thermal throttle duty (TTD).

Hence, here is an important issue about how to dynamically adjust CPU performance with respect to CPU temperature to achieve proper temperature adjustment.

BRIEF SUMMARY OF THE INVENTION

A detailed description is given in the following embodiments with reference to the accompanying drawings.

An exemplary embodiment of a thermal throttling duty estimation method for a central processing unit (CPU) is implemented in a computer system for adjusting CPU temperature.

In the method, the computer system stores a plurality of settings comprising an initial throttle duty (INID), a shutoff threshold temperature (SHFT), an initial throttle threshold temperature (INIT), and a temperature scale (TS) and begins a boot process. The settings may be determined by experience, configured through a basic input/output system (BIOS), and stored in a predetermined storage space.

During execution of the CPU, CPU temperature data (CPUT) is received therefrom. The CPU may periodically deliver current CPU temperature data (CPUT). Most current CPUs (such as a K8 CPU) used in computer systems support periodic deliver of current CPU temperature data (CPUT) which may be utilized for the following calculation. It is determined whether the CPU temperature data (CPUT) is greater than the shutoff threshold temperature (SHFT). When the CPU temperature data (CPUT) is greater than the shutoff threshold temperature (SHFT), meaning that temperature of the CPU exceeds the shutoff threshold temperature (SHFT), the computer system is shut off to prevent damage to the computer system.

Thus, the method may be utilized to dynamically calculate the thermal throttle duty (TTD) based on the variance of CPU temperature and dynamically adjust CPU performance according to the calculated TTD.

Additionally, a thermal throttling duty estimation system for a CPU is provided and implemented in a computer system for adjusting CPU temperature. The system comprises a controller and a thermal management unit. The computer system stores an initial throttle duty (INID), a shutoff threshold temperature (SHFT), an initial throttle threshold temperature (INIT), and a temperature scale (TS) and boots. The controller, coupled to the CPU, receives CPU temperature data (CPUT) therefrom.

The thermal management unit coupled to the controller and the CPU calculates a thermal throttle duty (TTD) based on the CPU temperature data (CPUT) and transmits the thermal throttle duty (TTD) to the CPU. The CPU then adjusts the CPU performance thereof according to the thermal throttle duty (TTD). Specifically, the thermal throttle duty (TTD) specifies the duration where the CPU is under adjustment. CPU performance may be upgraded or degraded in the adjustment.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
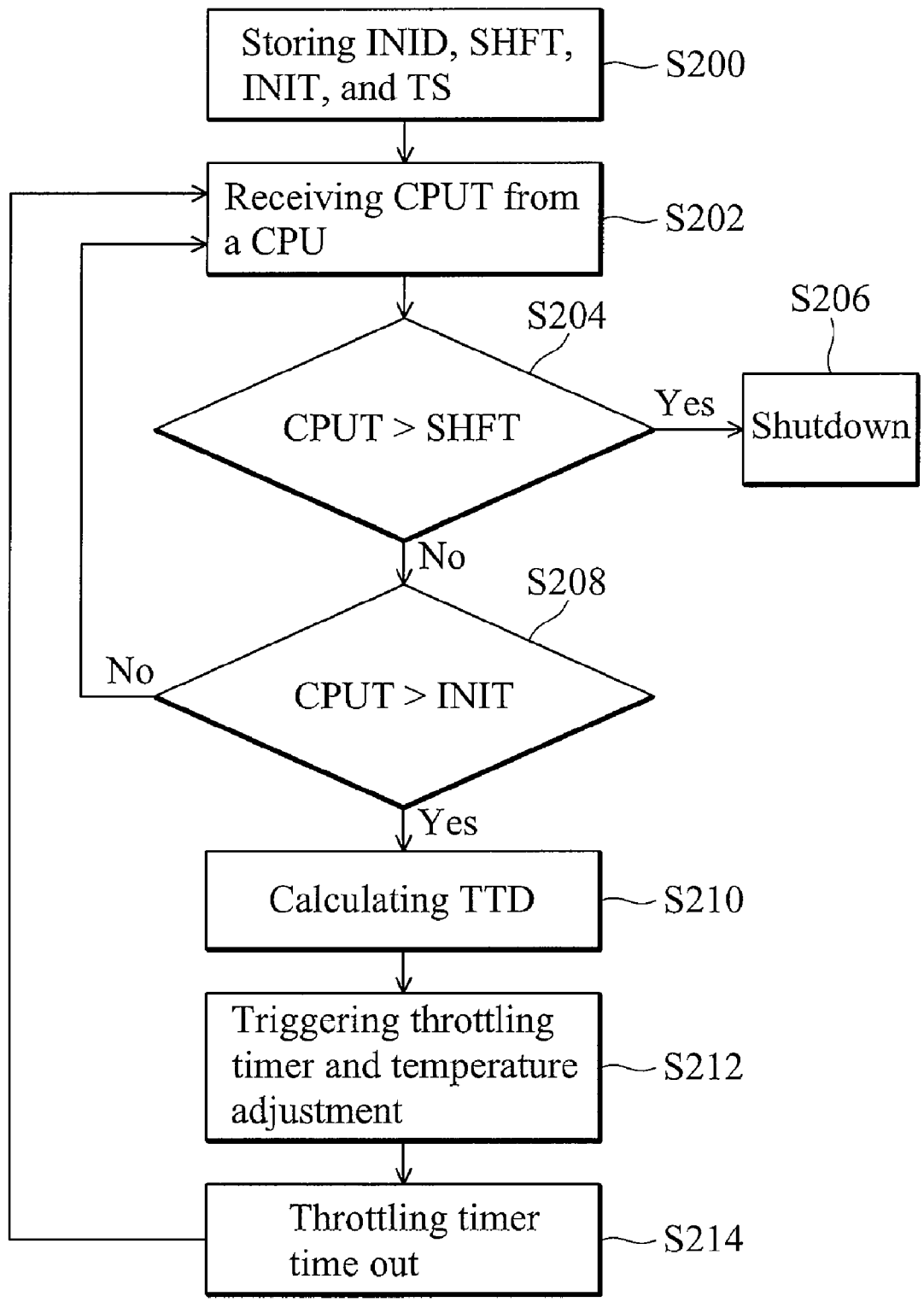
FIG. 1 is a flowchart of an exemplary embodiment of a thermal throttling duty estimation method for a CPU.

With reference to FIG. 1, a thermal throttling duty estimation method for a central processing unit (CPU) is provided. The thermal throttling duty estimation method in FIG. 1 for a CPU is implemented in a computer system 30 for adjusting the temperature of the CPU of computer system 30. First, step S200 is executed, wherein the computer system 30 stores a plurality of settings comprising an initial throttle duty (INID), a shutoff threshold temperature (SHFT), an initial throttle threshold temperature (INIT), and a temperature scale (TS) and begins a boot process. The settings may be configured through a basic input/output system (BIOS) and determined through experience.

Next, in step S202, CPU temperature data (CPUT) is received from the CPU. The CPU may periodically deliver current CPU temperature data (CPUT). In step S204, it is determined whether the CPU temperature data (CPUT) is greater than the shutoff threshold temperature (SHFT). When the CPU temperature data (CPUT) is greater than the shutoff threshold temperature (SHFT), meaning that the temperature of the CPU exceeds the shutoff threshold temperature (SHFT), step S206 is executed to shut off the computer system 30 due to safety concerns, thus, ensuring normal operation of the computer system.

In step S204, when the CPU temperature data is not greater than the shutoff threshold temperature (SHFT), step S208 is executed. Whether the CPU temperature data (CPUT) is greater than the initial throttle threshold temperature (INIT) is then determined. When the CPU temperature data (CPUT) is greater than the initial throttle threshold temperature (INIT), step S210 is executed to calculate the thermal throttle duty (TTD).

In step S208, when the CPU temperature data (CPUT) is not greater than the initial throttle threshold temperature (INIT), step S202 is repeated to wait for new CPU temperature data (CPUT).

The thermal throttle duty (TTD) is converted to a digital signal for transmission to the CPU by referencing a table. In step S212, based on the digital signal converted from the thermal throttle duty (TTD), a timer is activated to count time for the duration of the CPU performance adjustment, thus, the CPU performance according to the thermal throttle duty (TTD) is adjusted. CPU performance may be enhanced or lowered in the adjustment process.

In step S214, the timer continues counting until reaching a number represented by the thermal throttle duty (TTD), and step S202 is repeated accordingly to await new CPU temperature data (CPUT). The thermal throttle duty (TTD) is derived from the initial throttle duty (INID) minus an offset. That is:

$$TTD=INID-\text{OFFSET}.$$

The offset is derived from the following formula:

$$[(CPUT-INIT)/TS]-1<\text{OFFSET}<(CPUT-INIT)/TS;$$

wherein CPUT is the CPU temperature data (CPUT), INIT is the initial throttle threshold temperature (INIT), TS is the temperature scale (TS), and OFFSET is the offset.

For example, if the formula is substituted by CPUT=73, INIT=50, and TS=1, then:

$$[(73-50)/10]-1<\text{OFFSET}<(73-50)/10.$$

Thus, the value of the offset is derived as 2, the thermal throttle duty (TTD) is derived from 6−2=4. The derived thermal throttle duty (TTD) is utilized to look up a table, exemplified by the following Table 1. With reference to Table 1, value "4", or "0100" in binary format, of the thermal throttle duty (TTD) corresponds to a proportion of 25%. When counting up to "4", timer expires and signifies the CPU to stop the CPU performance adjustment. Thus, the table is referred to when converting the thermal throttle duty (TTD) to a digital signal for transmission to the CPU.

TABLE 1

| | |
|---|---|
| 0000 | 0% |
| 0001 | 6.25% |
| 0010 | 12.5% |
| 0011 | 18.75% |
| 0100 | 25% |
| 0101 | 31.25% |
| 0110 | 37.5% |
| 0111 | 43.75% |
| 1000 | 50% |
| 1001 | 56.25% |
| 1010 | 62.5% |
| 1011 | 68.75% |
| 1100 | 75% |
| 1101 | 81.25% |
| 1110 | 87.5% |
| 1111 | 93.75% |

Figure 2:
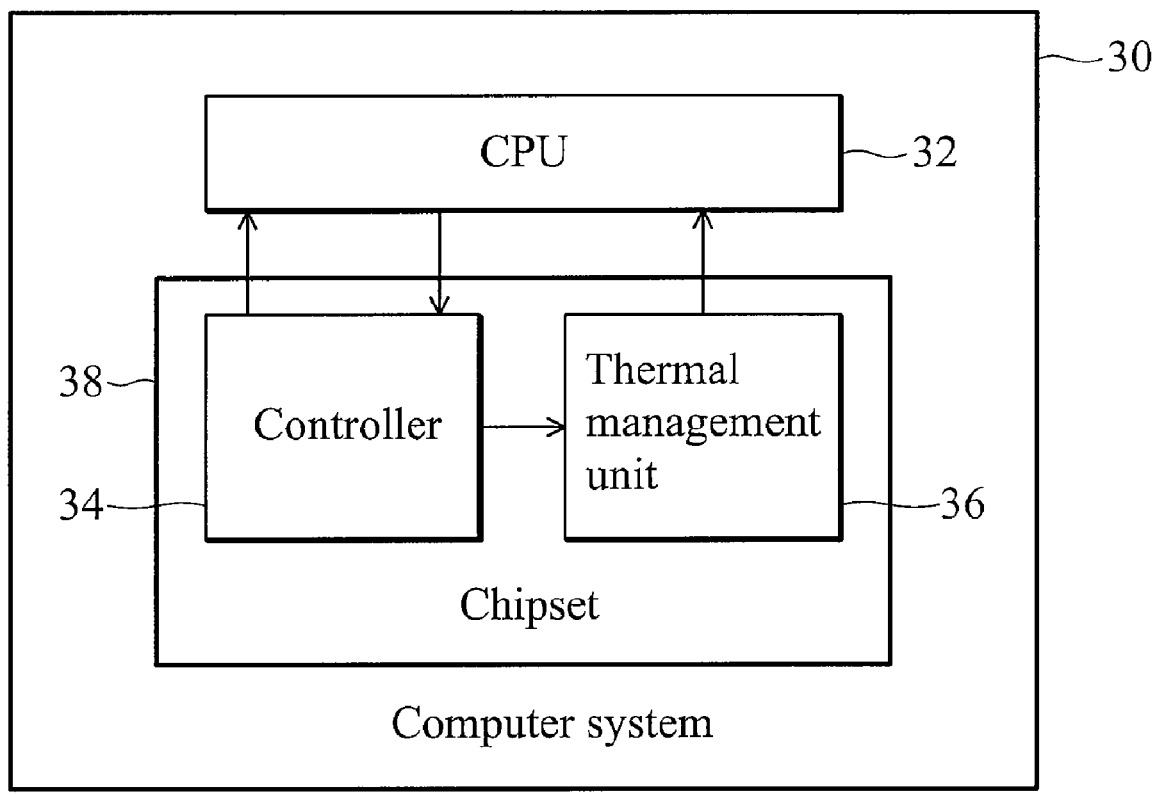
FIG. 2 is a schematic diagram of an exemplary embodiment of a thermal throttling duty estimation system for a CPU.

With reference to FIG. 2, a thermal throttling duty estimation system for a CPU is provided. The system in FIG. 2 comprising controller 34 and thermal management unit 36 is implemented in a computer system 30 to adjust CPU 32 thereof.

Computer system 30 stores an initial throttle duty (INID), a shutoff threshold temperature (SHFT), an initial throttle threshold temperature (INIT), and a temperature scale (TS) and boots. Controller 34 coupled to the CPU 32 receives CPU temperature data (CPUT) from the CPU 32.

Thermal management unit 36 coupled to the controller 34 and the CPU 32 calculates a thermal throttle duty (TTD) based on the CPU temperature data (CPUT) and transmits the thermal throttle duty (TTD) to CPU 32. CPU 32 then adjusts the CPU performance thereof according to the thermal throttle duty (TTD). Specifically, the thermal throttle duty (TTD) specifies the duration in which the CPU is adjusted. CPU performance may be increased or decreased in the adjustment.

Before calculating the thermal throttle duty (TTD), thermal management unit 36 further determines if the CPU temperature data (CPUT) is greater than the shutoff threshold temperature (SHFT) and, when the CPU temperature data (CPUT) is greater than the shutoff threshold temperature (SHFT), shuts off computer system 30. When the CPU temperature data (CPUT) is not greater than the shutoff threshold temperature (SHFT), thermal management unit 36 further determines if the CPU temperature data (CPUT) is greater than the initial throttle threshold temperature, and, when the CPU temperature data (CPUT) is greater than the initial throttle threshold temperature (INIT), calculates the thermal throttle duty (TTD).

The thermal throttle duty (TTD) is derived from the initial throttle duty (INID) minus an offset. The offset is derived from the following formula:

$$[(CPUT-INIT)/TS]-1<\text{OFFSET}<(CPUT-INIT)/TS;$$

wherein CPUT is the CPU temperature data, INIT is the initial throttle threshold temperature, TS is the temperature scale, and OFFSET is the offset.

Before transmitting the thermal throttle duty (TTD), thermal management unit 36 further refers to a table and accordingly converts the thermal throttle duty (TTD) to a digital signal for transmission to the CPU 32 by referencing a table. Controller 34 and thermal management unit 36 may be implemented in chipset 38 (such as a south bridge) of computer system 30.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A thermal throttling duty estimation method for a central processing unit (CPU), implemented in a computer system, comprising:
    receiving CPU temperature data (CPUT) from the CPU;
    calculating a thermal throttle duty (TTD) based on the CPU temperature data;
    transmitting the thermal throttle duty to the CPU;
    adjusting the CPU performance according to the thermal throttle duty;

storing an initial throttle duty (INID), a shutoff threshold temperature (SHFT), an initial throttle threshold temperature (INIT), and a temperature scale (TS);

wherein the thermal throttle duty specifies a duration of the CPU performance adjustment;

wherein the thermal throttle duty is derived from the initial throttle duty minus an offset;

wherein the offset is derived from the following formula:

$$[(CPUT-INIT)/TS]-1 < OFFSET < (CPUT-INIT)/TS;$$
and wherein CPUT is the CPU temperature data, INIT is the initial throttle threshold temperature, TS is the temperature scale, and OFFSET is the offset.

2. The method as claimed in claim 1, wherein the adjustment comprises increasing the CPU performance.

3. The method as claimed in claim 1, wherein the adjustment comprises decreasing the CPU performance.

4. The method as claimed in claim 1, wherein before calculating the thermal throttle duty, further comprising:

determining if the CPU temperature data is greater than the shutoff threshold temperature; and when the CPU temperature data is greater than the shutoff threshold temperature, shutting off the computer system.

5. The method as claimed in claim 1, wherein before calculating the thermal throttle duty, further comprising:

determining if the CPU temperature data is greater than an initial throttle threshold temperature; and when the CPU temperature data is greater than the initial throttle threshold temperature, calculating the thermal throttle duty.

6. The method as claimed in claim 1, wherein before transmitting the thermal throttle duty, further comprising converting the thermal throttle duty to a digital signal for transmission to the CPU by referring to a table.

7. A thermal throttling duty estimation system for a central processing unit (CPU), implemented in a computer system, comprising:

a controller coupled to the CPU, receiving CPU temperature data (CPUT) from the CPU; and a thermal management unit coupled to the controller and the CPU, calculating a thermal throttle duty (TTD) based on the CPU temperature data and transmitting the thermal throttle duty to the CPU, wherein the CPU adjusts the CPU performance thereof according to the thermal throttle duty;

wherein the thermal throttle duty specifies a duration of the CPU performance adjustment;

wherein the computer system stores an initial throttle duty (INID), a shutoff threshold temperature (SHFT), an initial throttle threshold temperature (INIT), and a temperature scale (TS);

wherein the thermal management unit derives the thermal throttle duty by subtracting an offset from the initial throttle duty;

wherein the offset is derived from the following formula:

$$[(CPUT-INIT)/TS]-1 < OFFSET < (CPUT-INIT)/TS;$$
and wherein CPUT is the CPU temperature data, INIT is the initial throttle threshold temperature, TS is the temperature scale, and OFFSET is the offset.

8. The system as claimed in claim 7, wherein the adjustment comprises increasing the CPU performance.

9. The system as claimed in claim 7, wherein the adjustment comprises decreasing the CPU performance.

10. The system as claimed in claim 7, wherein before calculating the thermal throttle duty, the thermal management unit further determines if the CPU temperature data is greater than the shutoff threshold temperature (SHFT) and, when the CPU temperature data is greater than the shutoff threshold temperature, shuts off the computer system.

11. The system as claimed in claim 7, wherein before calculating the thermal throttle duty, the thermal management unit further determines if the CPU temperature data is greater than an initial throttle threshold temperature (INIT), and, when the CPU temperature data is greater than the initial throttle threshold temperature, calculates the thermal throttle duty.

12. The system as claimed in claim 7, wherein before transmitting the thermal throttle duty, the thermal management unit further converts the thermal throttle duty to a digital signal for transmission to the CPU with reference to a table.

\* \* \* \* \*